United States Patent [19]

Yoshida et al.

[11] Patent Number: 4,775,823
[45] Date of Patent: Oct. 4, 1988

[54] METHOD FOR CONTROLLING OPENING/CLOSING OPERATION OF AUTOMATIC DOOR IN ITS ACCIDENTAL CONDITION

[75] Inventors: Yukio Yoshida, Namerikawa; Akiyoshi Takimoto, Toyama; Kenzo Ono, Toyama; Kiyotada Nishikawa, Kurobe; Toshio Oura, Namerikawa, all of Japan

[73] Assignee: Yoshida Kogyo K. K., Tokyo, Japan

[21] Appl. No.: 947,394

[22] Filed: Dec. 29, 1986

[30] Foreign Application Priority Data

Dec. 28, 1985 [JP] Japan .................................. 60-298249

[51] Int. Cl.⁴ ......................... E05F 15/00; G05D 3/00
[52] U.S. Cl. ..................................... 318/266; 318/272; 318/277
[58] Field of Search ............... 318/256, 257, 264, 265, 318/266, 280, 281, 282, 286, 461, 466, 467, 468, 470, 272, 277; 49/26, 28

[56] References Cited

U.S. PATENT DOCUMENTS

| | | | |
|---|---|---|---|
| 3,891,909 | 6/1975 | Newson | 318/282 X |
| 4,092,575 | 5/1978 | Ogishi et al. | 318/282 |
| 4,529,920 | 7/1985 | Yoshida et al. | 318/468 X |
| 4,565,954 | 1/1986 | Yamanishi et al. | 318/282 X |

FOREIGN PATENT DOCUMENTS 3244932 6/1984 Fed. Rep. of Germany .......... 49/28

Primary Examiner—Bentsu Ro
Attorney, Agent, or Firm—Hill, Van Santen, Steadman & Simpson

[57] ABSTRACT

According to a method for controlling an automatic door of the present invention, even when an accidental condition occurs due to some obstacle clogging a traveling lane of the door, the door can move at a high speed to its deceleration point so as to immediately enable a man to go through the door opening, while the door is prevented from colliding at a high speed against the obstacle repeatedly to make it possible to increase both the durability and safety of the door.

2 Claims, 9 Drawing Sheets

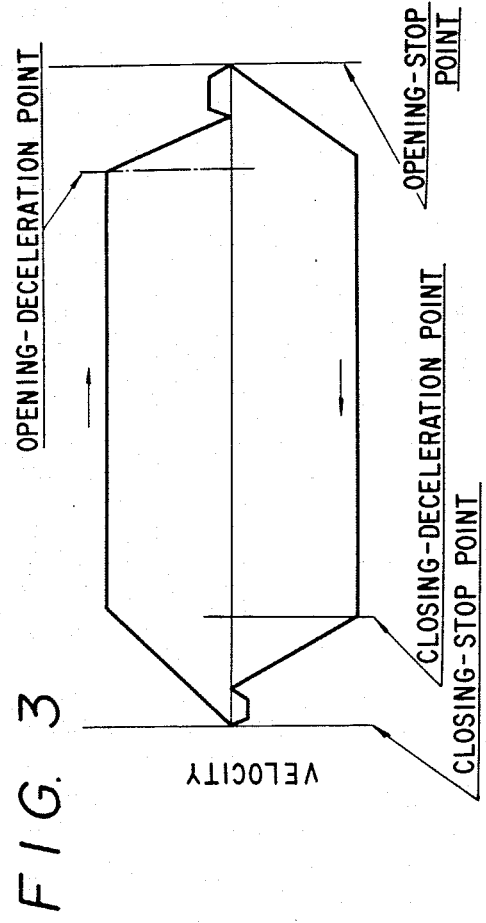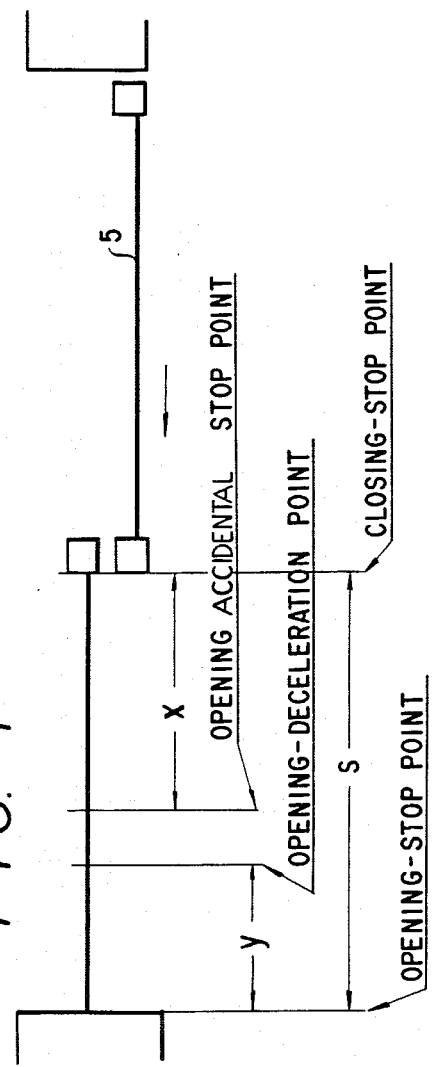

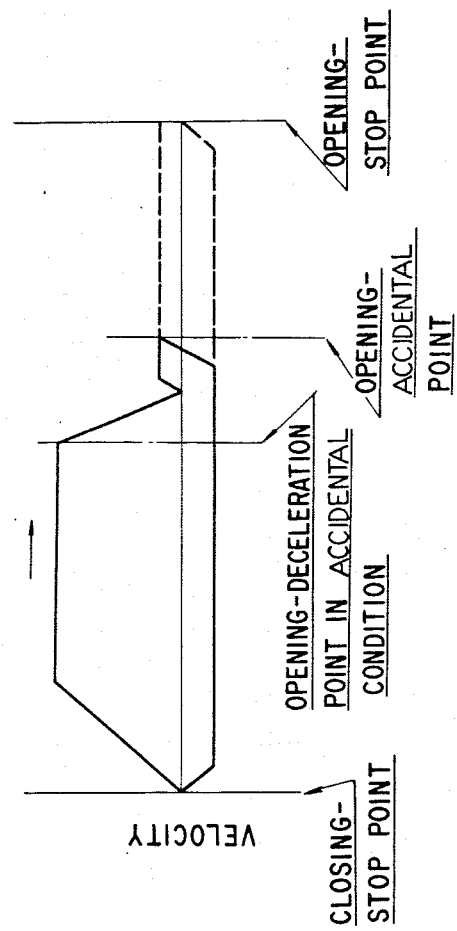

TO BE CONTINUED TO (X) IN FIG. 6-2

METHOD FOR CONTROLLING OPENING/CLOSING OPERATION OF AUTOMATIC DOOR IN ITS ACCIDENTAL CONDITION

BACKGROUND OF THE INVENTION

1. Field of the Invention

This invention relates to a method for controlling a door in an automatic door system, and more particularly to a method for controlling the opening/closing operation of a door in an automatic door system when an accidental condition of the door occurs.

2. Description of the Prior Art:

In a conventional automatic door system, when there is a human-body detection signal in a normal operation of a door of the system, the door thereof conducts its high-speed opening operation until it reaches a deceleration point thereof in its opening operation, and thereafter conducts its low-speed opening operation until the door reaches its stop point in the opening operation thereof (hereinafter referred to as the opening-stop point). After the door's arrival in the opening-stop point, the door conducts its high-speed closing operation until it reaches a deceleration point thereof in its closing operation. After the door's arrival in the deceleration point, the door conducts its low-speed closing operation until it reaches a stop point thereof in its closing operation (hereinafter referred to as the closing-stop point).

In such a normal opening/closing operation of the door, when a traveling lane of the door is clogged with some obstacle such as a stone and the like, the door collides with such obstacle to cause an accidental condition of the door in its operation.

Hitherto, in such accidental condition, the door conducts its low-speed opening/closing operation to move to its opening-stop point or to its closing-stop point, so that the opening-stop point or the closing-stop point of the door is checked and then a normal opening/closing operation of the door is conducted.

In such opening/closing control of the door conducted in the accidental condition of the same, the low-speed opening/closing operation of the door is repeated before completion of a check on the opening-stop point or the closing-stop point of the door, so that, in case that a human-body detection signal is inputted before completion of such check, the low-speed opening/closing operation of the door is repeated to delay a person going through the door opening. Such delay is not preferable in use and constitutes a disadvantage inherent in a conventional method for controlling the automatic door in its opening/closing operation when an accidental condition of the door occurs.

SUMMARY OF THE INVENTION

It is an object of the present invention to provide a method for controlling an automatic door in its opening/closing operation when an accidental condition of the door occurs in such operation, without causing the above-mentioned delay inherent in the conventional method.

In the method of the present invention, a deceleration point is established according to a position of the door at a time when such accidental condition occurs; and, in case that a human-body detection signal is inputted, the door moves at a high speed to the above deceleration point so that the door is controlled in its opening/closing operation to swiftly conduct its opening/closing operation even when the accidental condition occurs, so that a person may immediately go through the door opening while the door is prevented from colliding with the obstacle at the accidental condition occurring point.

BRIEF DESCRIPTION OF THE DRAWINGS

FIG. 3 is a graph showing a normal opening/closing operation of the door of the automatic door system for working the method of the present invention;

FIG. 4 is a diagram for illustrating a manner for establishing the deceleration point of the door in its opening/closing operation;

FIG. 5 is a graph showing the operation of the door in the accidental condition occurring in its opening operation;

FIGS. 6-1 and 6-2 are flowcharts illustrating the operation of the automatic door system conducted in the accidental condition occurring in the opening operation of the door;

FIGS. 9-1 and 9-2 are flowcharts illustrating the operation of the automatic door system conducted in the extraneous condition occurring in the closing operation of the door.

DESCRIPTION OF THE PREFERRED EMBODIMENT

Figure 1:
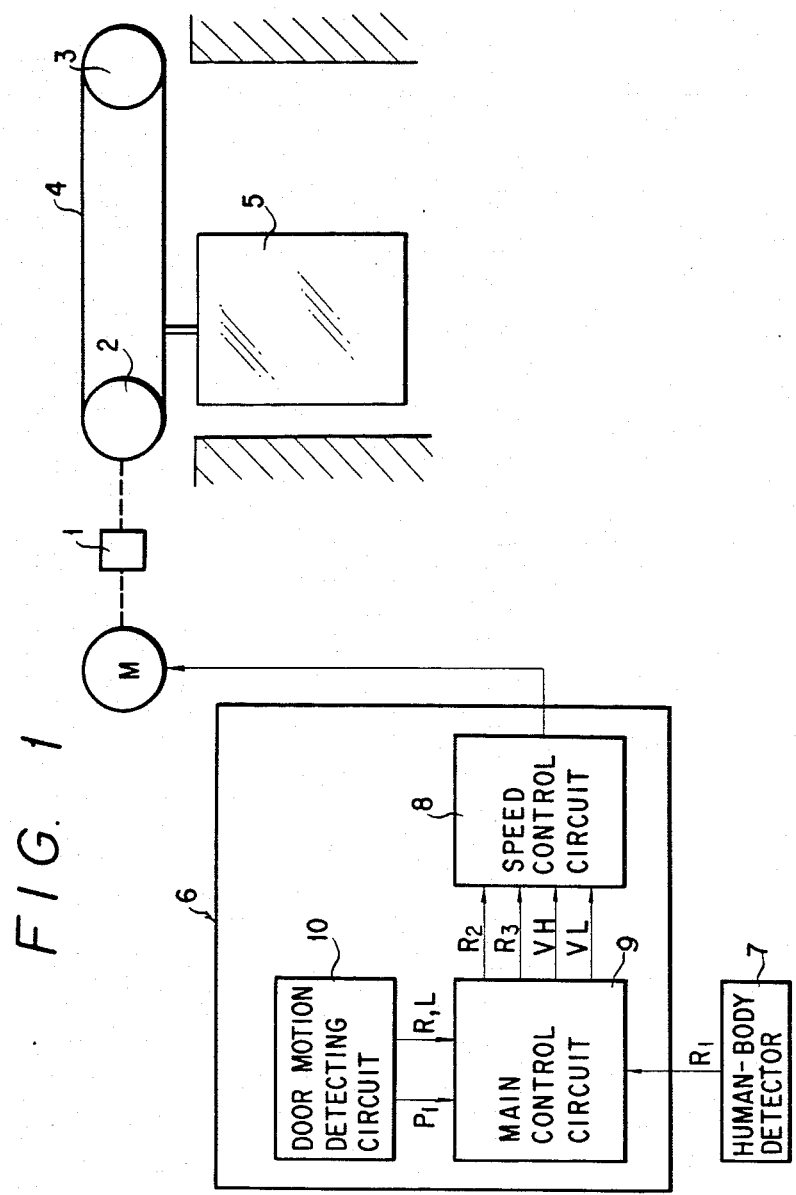
FIG. 1 is a schematic view illustrating the whole automatic door system for working the method of the present invention.

Hereinbelow, an embodiment of a method of the present invention will be described with reference to the accompanying drawings, wherein the reference numeral 5 denotes a door of an automatic door system for working the embodiment of the present invention.

FIG. 1 is a schematic view illustrating the whole automatic door system for working the embodiment of the method of the present invention, wherein: the reference character M denotes a motor connected with a driving pulley 2 through a reduction gear 1. The door 5 is connected to a belt 4 running around the driving pulley 2 and a driven pulley 3. The motor M is controlled in its actuation, and in direction and speed of rotation by means of a control unit 6 of the automatic door system.

The control unit 6 comprises: a speed-control circuit 8 for the motor M; a main control circuit 9 for issuing a normal-rotation signal $R_2$, a reverse-rotation signal $R_3$, a high-speed signal VH and a low-speed signal VL to a speed-control circuit 8 so as to control a normal opening/closing operation of the door 5 after receiving a human-body detection signal $R_1$ issued from a human-body detector 7 such as a mat switch and the like. A door-motion detecting circuit 10 is included for identifying clock pulses $P_1$, which when counted are proportional to a traveling distance of the door 5, and for identifying the opening/closing operation of the door 5, so as to issue an opening signal R for the door 5 and a closing signal L for the door 5. The door-motion detecting circuit 10 comprises a detector and a direction-identifying circuit as disclosed in Japanese Patent Application Laid-Open Specification No. 58-210271.

Now, the details of the operation of the door 5 will be described with reference to FIG. 2.

(1) In a normal opening/closing operation:

When the human-body detection signal $R_1$ is inputted to a command circuit 11 from the human-body detector 7, the command circuit 11 issues the normal rotation signal $R_2$ to the speed-control circuit 8, while the clock pulses $P_1$ are counted by a counter circuit 12 to detect a position of the door 5 under consideration. A signal of which door position issued from the counter circuit 12 is compared with a signal of a deceleration point in the opening operation of the door 5 (hereinafter referred to as the opening-deceleration point) issued from an opening-deceleration-point setting unit 13 in a first comparator $14_1$. In case that the door 5 does not reach the opening-deceleration point, the first comparator $14_1$ does not issue any signal to a first AND gate $15_1$ so that the first AND gate $15_1$ does not issue any signal. On the other hand, the normal rotation signal $R_2$ is also inputted to a second OR gate $16_2$ to have the same $16_2$ issue a signal to a third AND gate $15_3$ to which is also inputted a signal issued from an inverter 17, so that the third AND gate $15_3$ issued the high-speed signal VH to the speed-control circuit 8, whereby the motor M rotates at a high speed in its normal direction to cause the door 5 to conduct its high-speed opening operation.

When the door 5 reaches the opening-deceleration point as counter by the counter circuit 12, the first comparator $14_1$ issues a signal to the first AND gate $15_1$ and in turn the first AND gate $15_1$ issues a signal to a first OR gate $16_1$ which issues a signal to a third OR gate $16_3$ which issues the low-speed signal VL to the speed-control circuit 8. The inverter 17 does not issue its signal to the third AND gate $15_3$ to cause the same $15_3$ not to issue the high-speed signal VH to the speed-control circuit 8 for the motor M so that the motor M rotates at a low speed in its normal direction to cause the door 5 to conduct its low-speed opening operation.

When the door 5 reaches an opening-stop point, a pulse-interval check circuit 18 detects a long pulse interval of the clock pulses $P_1$ to issue a signal $R_4$ to the command circuit 11 so that the command circuit 11 issues a stop signal to the speed-control circuit 8 to cause the motor M to brake to a stop. Then, after a certain time has elapsed, the command circuit 11 issues the reverse-rotation signal $R_3$ to both the speed-control circuit 8 and a second AND gate $15_2$, while the clock pulses $P_1$ are counted by the counter circuit 12 to detect a position of the door 5 under consideration.

In this case, the position of the door 5 under consideration is counted by the counter circuit 12 and compared by the second comparator $14_2$ with a deceleration point in the closing operation of the door 5 (hereinafter referred to as the closing-deceleration point) set by a closing deceleration point setting unit 19. In case that the thus counted value of the position of the door 5 is larger than a value showing the closing-deceleration point, the second comparator $14_2$ does not issue any signal to the second AND gate $15_2$ to cause the same $15_2$ not to issue any signal, so that the third AND gate $15_3$ issues the high-speed signal VH to the speed-control circuit 8 for the motor M to cause the same M to rotate at a high speed in its reverse direction, whereby the door 5 conducts its highspeed closing operation.

When the door 5 reaches the closing-deceleration point, the second comparator $14_2$ issues a signal to the second AND gate $15_2$ which issues a signal to the first OR gate $16_1$ which issues a signal to the third OR gate $16_3$ which issues the low-speed signal VL to the speed-control circuit 8 for the motor M as is in the same manner as described above to cause the motor M to rotates at a low speed in its reverse direction, whereby the door 5 conducts its low-speed closing operation. When the door 5 reaches a closing-stop point, the pulse-interval check circuit 18 issues the detection signal $R_4$ to the command circuit 11 to cause the motor M to brake to a stop as is in the same manner as described in the above, so that the door 5 stops at the closing-stop point.

The above operation of the door takes the form of a graph shown in FIG. 3.

(2) In the opening operation of the door 5 in which an accidental condition occurs:

The accidental condition of the door 5 means a case in which the door 5 is unable to increase its speed in spite of its high-speed opening operation, a case in which the door 5 is stopped in an area outside an area of the opening-deceleration point thereof, and the like case. The cause of such accidental condition is a stone or a like obstacle blocking the traveling lane of the door 5.

Such accidental condition is detected by means of the signal $R_4$ issued from the pulse-interval check circuit 18, which signal $R_4$ is inputted to the command circuit 11 to cause the same 11 to issue the stop signal to the speed-control circuit 8 for the motor M so that the motor M brakes to a sudden stop, whereby the door 5 is stopped.

In this case, a number counted in the counter circuit 12, i.e., a position of the door 5 under consideration is inputted to the first circuit 20, which stores the accidental condition occurring point in the opening operation of the door 5 and calculates a deceleration point in the opening operation of the door 5 (hereinafter referred to as the opening deceleration point upon the accidental condition), as the accidental condition occurring point is considered as a temporary stop point in the opening operation of the door 5 (hereinafter referred as the opening-stop point upon the accidental condition), while a flag 21 for storing the accidental condition occurring in the opening operation of the door 5 is set (hereinafter referred to as the opening-accident storing flag 21).

Thereafter, the human-body detection signal $R_1$ is checked as to whether it is present or not. In case that the human-body detection signal $R_1$ is present for a certain time, for example, for at least 5 seconds, the command circuit 11 issues both the normal rotation signal $R_2$ and a low-speed signal $R_5$ in the accidental condition (hereinafter referred to as the accidental low-speed signal $R_5$) so that the door 5 is moved at a low speed in its opening direction whereby it is checked as to whether the accidental condition continues or not. This check on the continuance of the accidental condition may be performed by checking the opening-accident storing flag 21. Namely, in case that the accidental condition disappears, the flag 21 is reset to make it possible to known the discontinuance of the accidental condition.

On the other hand, in case that the human-body detection signal $R_1$ does not continue for at least the certain time, the door 5 conducts its low-speed opening operation again as is in the above-mentioned case, and then in case that the accidental condition still continues, the command circuit 11 issues both the reverse rotation signal $R_3$ and the accidental low-speed signal $R_5$ to cause the door 5 to conduct its low-speed closing operation, whereby, in case that the accidental condition disappears, the door 5 can reach the opening-stop point to make it is possible to know the fact that the accidental condition disappears, so that in the following closing operation of the door 5, the door 5 conducts its normal closing operation, while the opening accident storing flag 21 is reset.

In case that the human-body detection signal $R_1$ is inputted to the command circuit 11 again in the low-speed closing operation of the door 5 mentioned above, the command circuit 11 issues the normal rotation signal $R_2$ to the speed-control circuit 8 for the motor M to cause the door 5 to conduct its high-speed opening operation as is in its normal opening/closing operation. At the same time, the command circuit 11 issues also a signal $R_6$ for changing the opening-deceleration point (hereinafter referred to as the opening-deceleration-point changing signal $R_6$) to the first circuit 20 so that a set value established in the opening-deceleration-point setting unit 13 is changed to a value calculated in the first circuit 20.

Namely, as shown in FIG. 4 wherein: the reference character S denotes an effective stroke of the door 5, i.e., a distance between the opening-stop point and the closing-stop point in the normal opening/closing operation; y a deceleration area in the normal operation of the door 5, i.e., a distance between the opening stop point and the opening deceleration point; and x a stroke of the door 5, i.e., the distance between the accidental condition occurring point and the closing-stop point, even when the deceleration point is set in an area of "S - y" in the normal operation of the door 5, that is set in an area of "x - y" after occurrence of the accidental condition.

Consequently, when the door 5 reaches a position spaced apart from the previous accidental condition occurring point by a distance of the deceleration area, the first comparator $14_1$ issues a signal to the first AND gate $15_1$ to eventually cause the third OR gate $16_3$ to issue the low-speed signal VL to the speed-control circuit 8 for the motor M as is in the case of the normal opening/closing operation of the door 5, so that the door 5 conducts its low-speed closing operation to gently abut on the previous accidental condition occurring point and continuously urge the same without colliding the same point at a high speed.

In conducting the above low-speed closing operation, in case that the human-body detection signal $R_1$ is not inputted to the command circuit 11 so that the door 5 moves to the closing-stop point, the door 5 stops at that point and the command circuit 11 issues the opening-deceleration-point changing signal $R_6$ to the first circuit 20 to change the set value established in the opening-deceleration-point setting unit 13 in the same manner as that described in the above, so that the door 5 stays as it is until the following human-body detection signal $R_1$ is inputted to the command circuit 11. When the human-body detection signal $R_1$ is inputted to the command circuit 11, the door 5 operates as is in its normal opening/closing operation. However, in this case, the opening-deceleration point has been already changed as described in the above to the opening deceleration point upon the accidental condition so that the door 5 is prevented from colliding against the previous accidental condition occurring point at a high speed.

Figure 2:
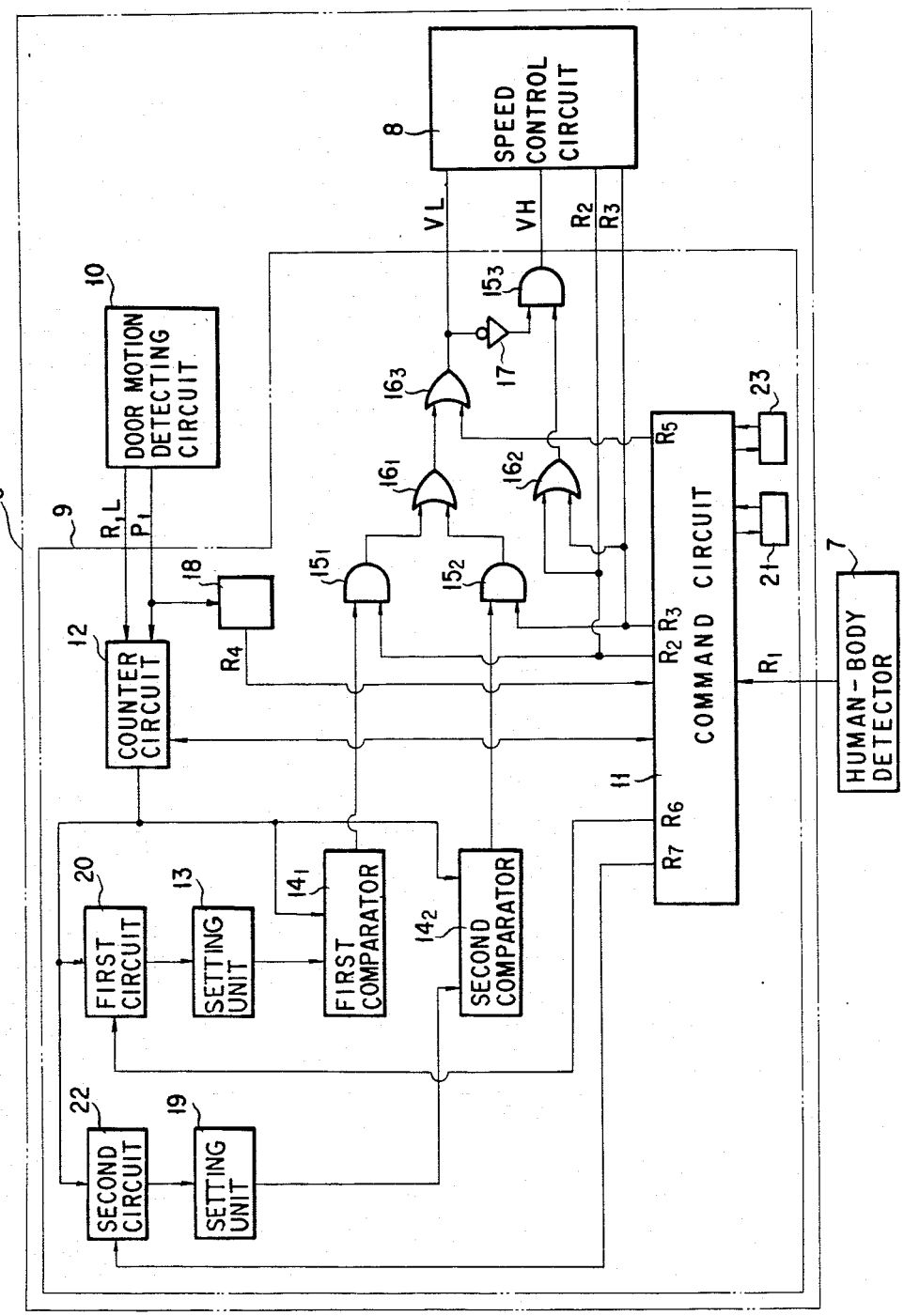
FIG. 2 is a block diagram illustrating a control apparatus employed in the automatic door system for working the method of the present invention.
Figures 1, 6:
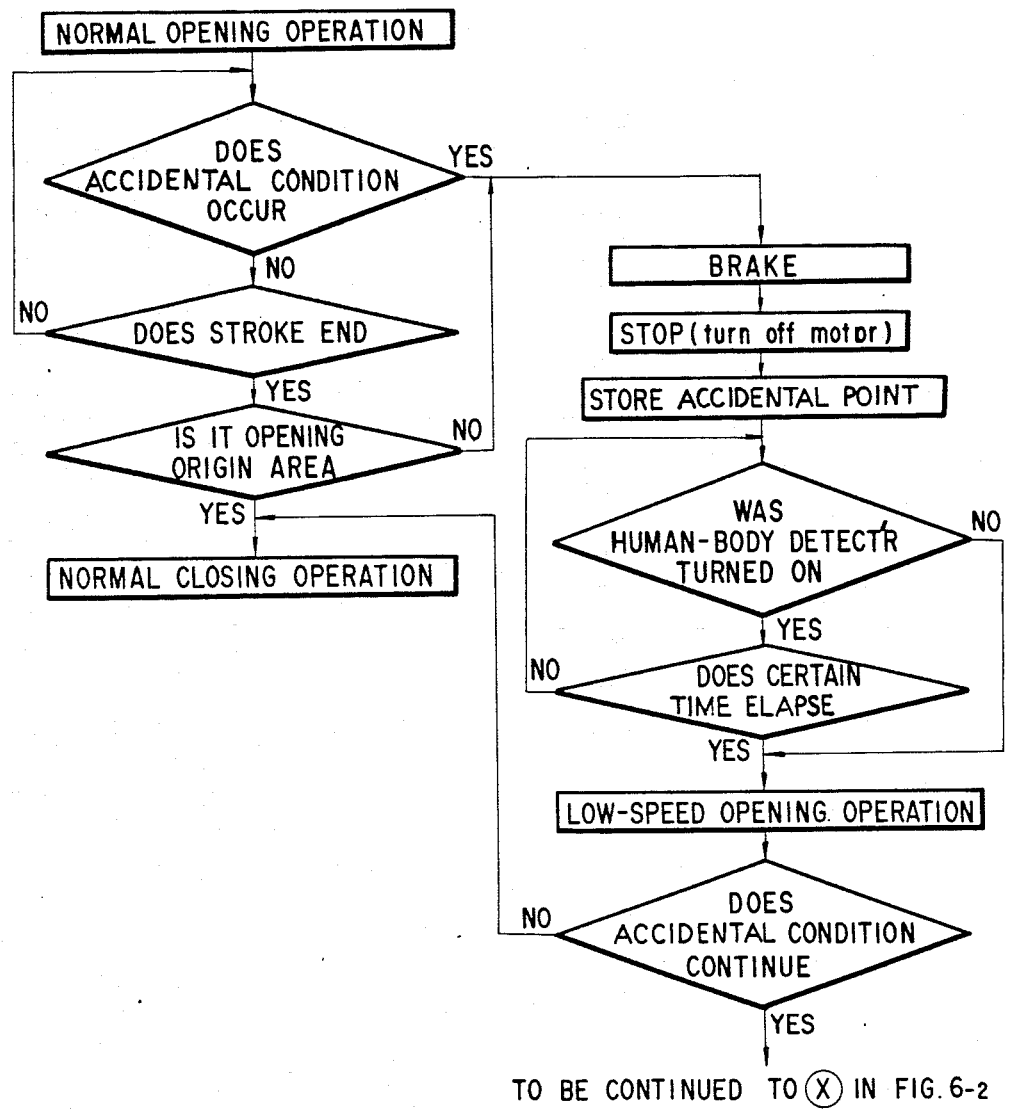
Figures 2, 6:
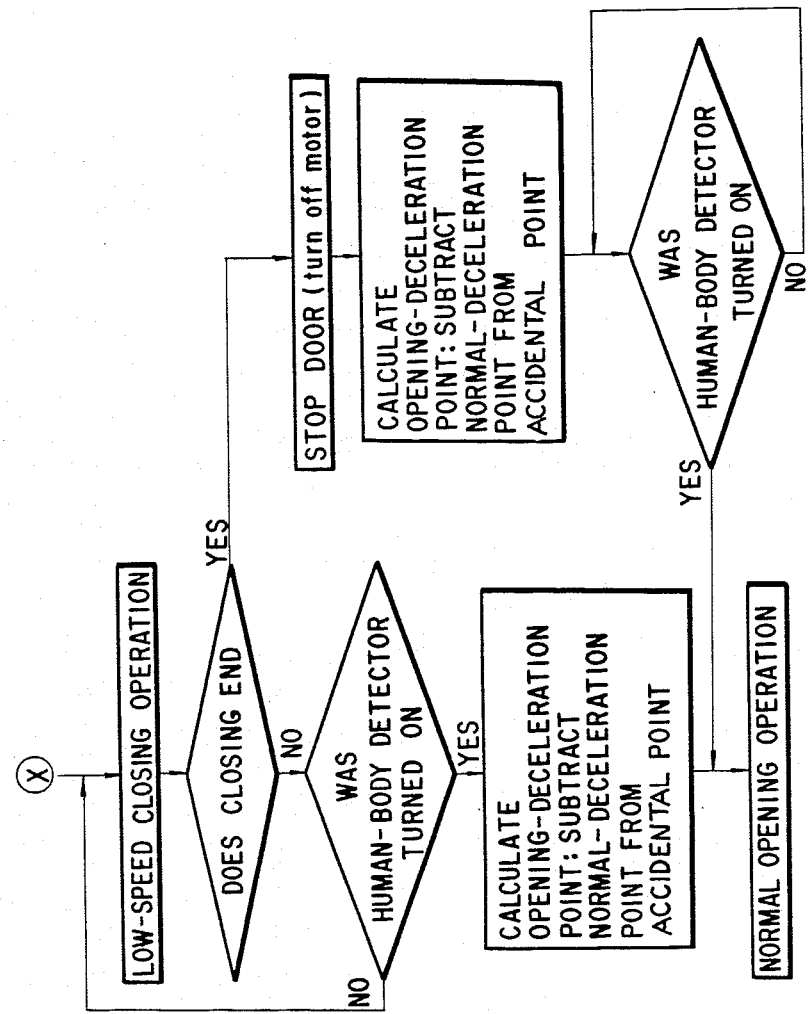

The above operation of the door 5 takes the form of a graph shown in FIG. 5, and also takes the form of a flowchart shown in FIGS. 6-1 and 6-2.

(3) In the closing operation in which the accidental condition of the door 5 occurs:

The occurrence of the accidental condition is detected as is in the opening operation of the door 5, and the command circuit 11 issues the stop signal to the speed-control circuit 8 for the motor M to cause the same M to brake to a stop so that the door 5 stops at the accidental condition occurring point.

At the same time, a counter number, i.e., a position of the door 5 under consideration is inputted to a second circuit 22, which stores the accidental condition occurring point in the closing operation of the door 5 and calculates the deceleration point in the same operation. The accidental condition occurring point is considered as a temporary stop point in the closing operation of the door 5 (hereinafter referred to as the closing-stop point upon the accidental condition) in calculation of a deceleration point in the closing operation of the door 5 (hereinafter referred to as the closing deceleration point). A flag 23 for storing the accidental condition occurring in the closing operation of the door 5 (hereinafter referred to as the closing-accident storing flag 23) is checked as to whether it is set or not.

Namely, it is checked as to whether the accidental condition occurs in the previous closing operation of the door 5, and in case that the closing-accident storing flag 23 is reset, it is considered that the accidental condition does not occur in the previous closing operation of the door 5 and that the accidental condition under consideration is the first one occurring in the closing operation of the door 5 so that the closing accident storing flag 23 is set. At the same time, the command circuit 11 issues the normal rotation signal $R_2$ to the speed-control circuit 8 for the motor M to immediately cause the door 5 to conduct its high-speed opening operation.

This high-speed opening operation of the door 5 is required to have the door 5 quickly disengage from the obstacle such as a man and the like in case that the door 5 hits the obstacle.

Figure 7:
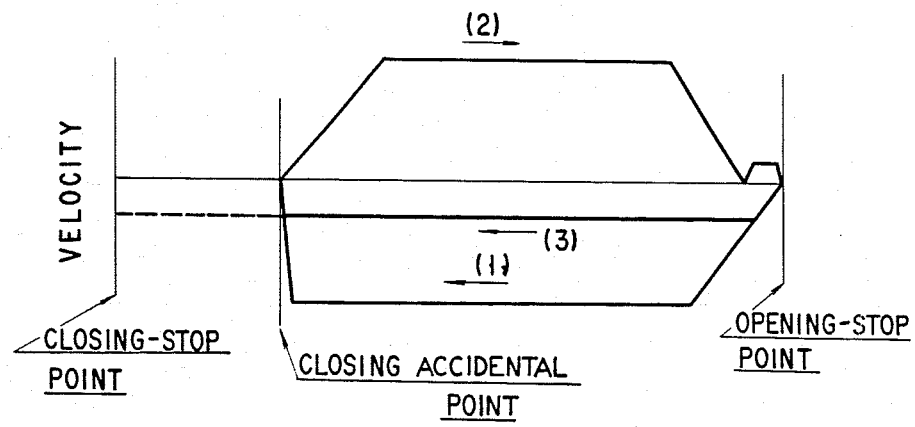
FIGS. 7 and 8 are graphs showing the operations of the door conducted in the extraneous condition occurring in the closing operation of the door.

Then, when the human-body detection signal $R_1$ is not inputted to the command circuit 11, the command circuit 11 issues both the reverse rotation signal $R_3$ and the accidental low-speed signal $R_6$ to have the door 5 conduct its low-speed closing operation so as to check whether the accidental condition occurs or not. In case that the accidental condition does not occur, for example, when a man goes through the door opening, the door 5 moves to its closing-stop point to make it possible to consider that there is no accidental condition in operation, so that the closing-accident storing flag 23 is reset, whereby the door 5 returns to its normal opening/closing operation. The above operation of the door 5 takes the form of a graph shown in FIG. 7.

On the other hand, in case that the accidental condition occurs again in the operation of the door 5 to stop the same halfway, since the closing-accident storing flag 23 is set, it is possible to consider that the accidental condition under consideration is the following one, so that the door 5 conducts the same operation as is in the case in which the accidental condition is repeated at least two times as described later.

Namely, in case that the closing-accident storing flag 23 has been set at a time when the accidental condition occurs, since the accidental condition is repeated at least two times, the door 5 stays at the accidental condition occurring point.

Such a stay of the door 5 is required, for example, to prevent the door 5 from conducting its opening/closing operation repeatedly and to let a man know the position of the accidental condition occurring point when the traveling lane of the door 5 is blocked with the obstacle such as a stone or the like.

In coincidence with this, the command circuit 11 issues a signal $R_7$ for changing the closing-deceleration point (hereinafter referred to as the closing-deceleration-point changing signal $R_7$) to the second circuit 22 so that the set value established in the closing-deceleration-point setting unit 19 is replaced with a resultant value obtained by subtracting the amount of a normal deceleration area from the value of the accidental condition occurring point in the closing operation of the door 5 (hereinafter referred to as the closing accidental point).

Under such circumstances, in case that the human-body detection signal $R_1$ is inputted to the command circuit 11, the door 5 conducts the above-mentioned opening/closing operation and stops again at the closing accidental point. At this time, since the value of the closing-deceleration point has been replaced with the above-mentioned resultant value, the door 5 stops gently without colliding against the closing accidental point.

Figure 8:
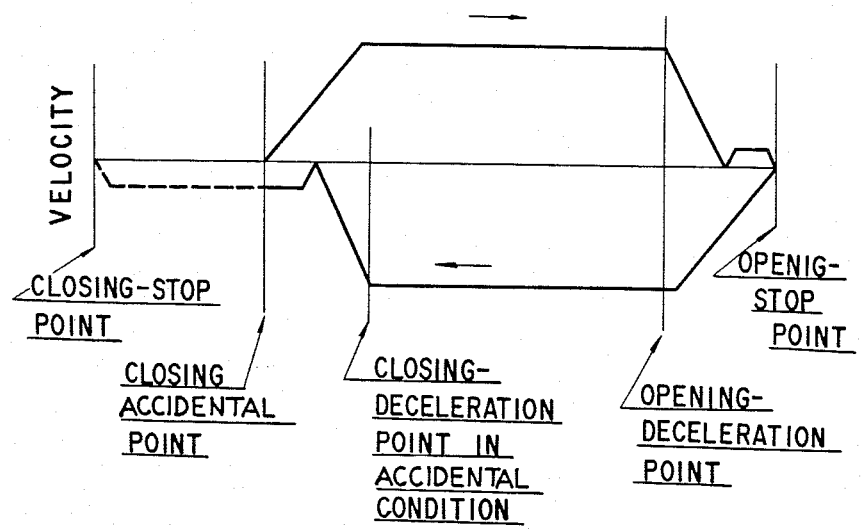

The above operation of the door 5 takes the form of a graph shown in FIG. 8.

On the other hand, in case that the human-body detection signal $R_1$ is not inputted to the command circuit 11 after elapse of at least a certain time when the door 5 stops at the closing accidental point, both the reverse rotation signal $R_3$ and the accidental low-speed signal $R_5$ are issued from the command circuit 11, for example, at 10 second-intervals to have the door 5 conduct its low-speed closing operation so as to make an effort to move the door 5 to the closing-stop point. When the door 5 reaches the closing-stop point, it is possible to consider that the door 5 is released from the accidental condition thereof, so that the closing-accident storing flag 23 is reset to return the door 5 to its normal opening/closing operation.

The above operation of the door 5 is required in view of the fact that: in case that the traveling lane of the door 5 is blocked with the obstacle such as a small piece of a stone, such small piece fo the stone is often knocked off by the door 5 to make it possible that the door 5 moves to its closing-stop point.

Figures 1, 9:
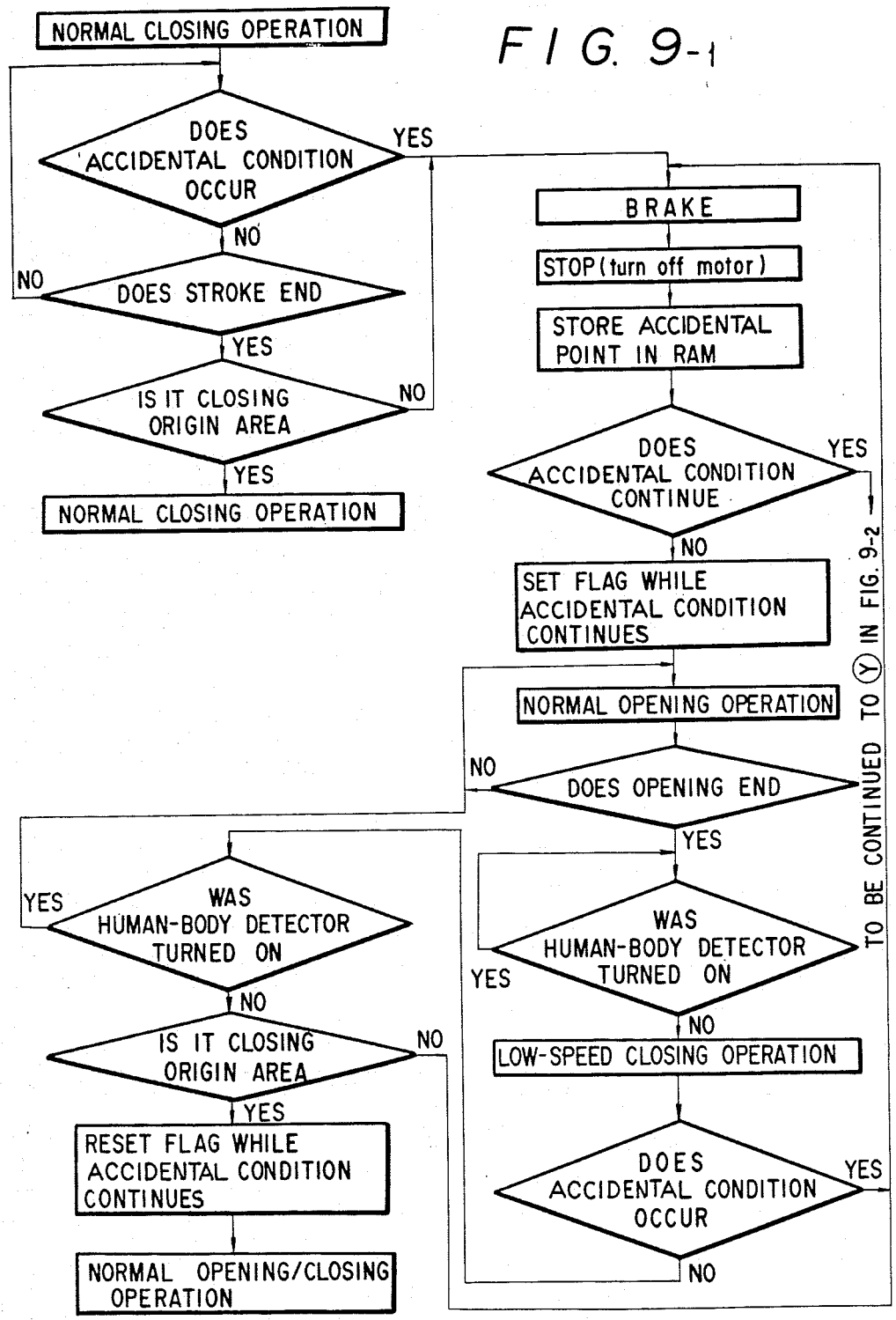
Figures 2, 9:
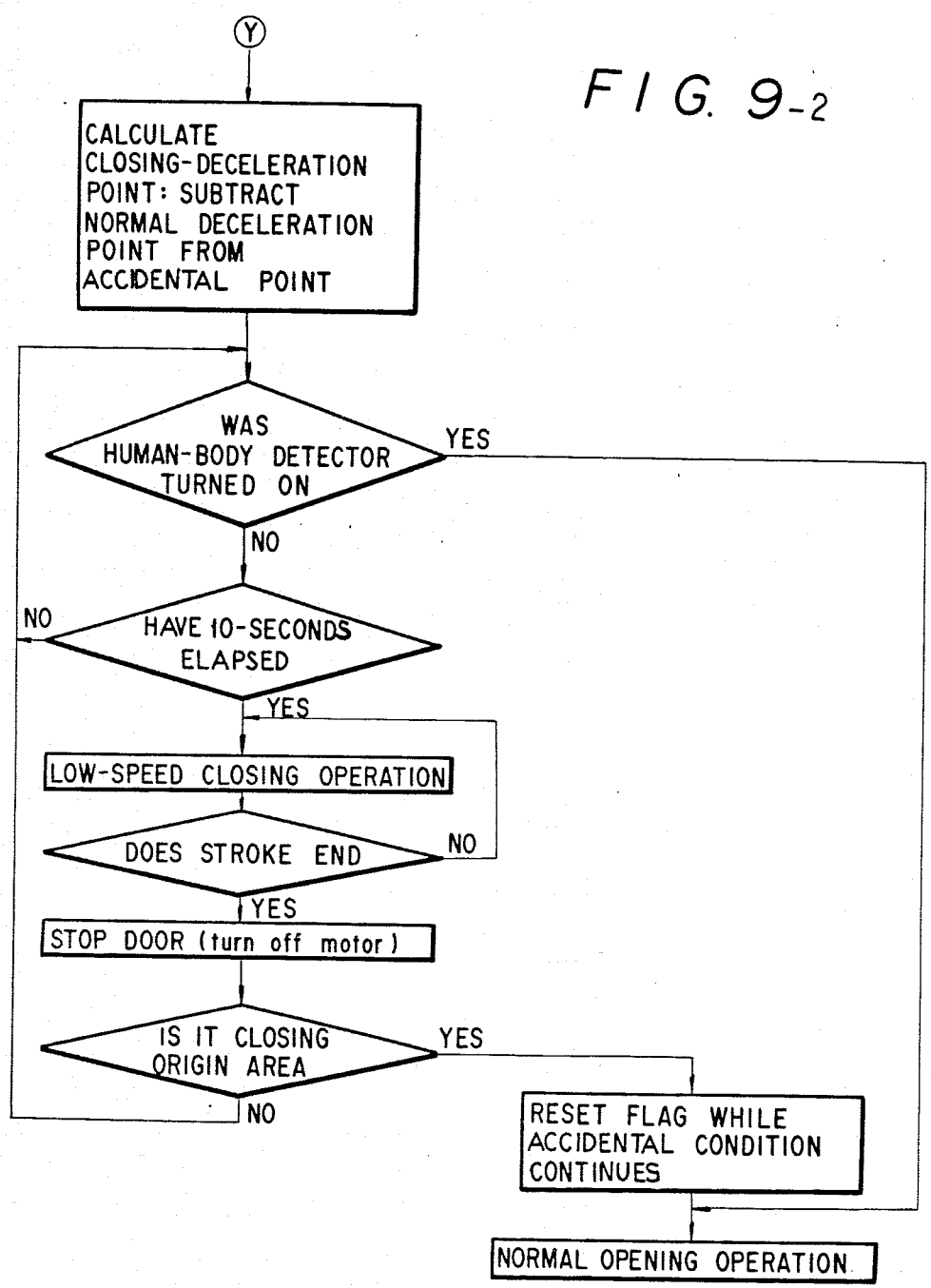

The above operation of the door 5 takes the form of a flowchart shown in FIGS. 9-1 and 9-2.

In present invention, even in the accidental condition, the door 5 is moved at a high speed to the deceleration point to immediately enable a man to go through the door opening, while being prevented from colliding at a high speed against the accidental point repeatedly to make it possible to increase both the durability and safety of the door 5.

What is claimed is:

1. A method for controlling a door of an automatic door system, the door conducting a normal opening/closing operation between a normal opening stop point and a normal closing stop point according to a predetermined normal opening/closing operation mode when in a normal operating condition, the method for controlling the door when in an accidental operating condition comprising the steps of:

establishing an accidental opening deceleration point and an accidental closing deceleration point based on a position of the door when an accidental condition occurs, said position where said accidental condition occurs being considered an accidental opening stop point or an accidental closing stop point during said establishing step; and moving the door at a high speed to said accidental opening deceleration point or said accidental closing deceleration point when a human body detection signal is input to said automatic door system to have the door conduct an opening/closing operation in an accidental operating mode.

2. A method as claimed in claim 1, further comprising the steps of:

moving the door at a low speed opening/closing operation;

confirming continuation of said accidental condition in the automatic door system by resetting an opening and closing accident storing flag when the door is moving at said low speed opening/closing operation; and eliminating said accidental condition in the automatic door sytem by confirming elimination of said accidental condition in the automatic door system by not resetting said opening and closing accident storing flag when the door is moving at said low speed opening/closing operation.

* * * * *